(12) United States Patent
Sato et al.

(10) Patent No.: US 6,428,065 B2
(45) Date of Patent: Aug. 6, 2002

(54) BUMPER STRUCTURE FOR AUTOMOBILE

(75) Inventors: Kenichi Sato; Tatsuya Morimoto, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,453

(22) Filed: Mar. 27, 2001

(30) Foreign Application Priority Data

Mar. 30, 2000 (JP) ........................................ 2000-092776

(51) Int. Cl.[7] ............................................... B60R 19/03
(52) U.S. Cl. ...................... 293/121; 293/102; 293/120; 293/132; 293/133
(58) Field of Search ............................... 293/15, 24, 42, 293/102, 107, 109, 112, 120, 121, 123, 131, 132, 133, 135, 136, 138, 142, 143, 146

(56) References Cited

U.S. PATENT DOCUMENTS

| | | | | |
|---|---|---|---|---|
| 4,348,042 A | * | 9/1982 | Scrivo | 293/120 |
| 4,671,550 A | * | 6/1987 | Molnar | 293/120 |
| 4,722,563 A | * | 2/1988 | Loren et al. | 293/120 |
| 5,094,469 A | * | 3/1992 | Yamamoto et al. | 280/500 |
| 5,711,562 A | * | 1/1998 | Terada et al. | 293/120 |
| 6,042,163 A | * | 3/2000 | Reiffer | 293/102 X |
| 6,106,039 A | * | 8/2000 | Maki | 293/132 |

FOREIGN PATENT DOCUMENTS

| | | | | | |
|---|---|---|---|---|---|
| JP | 59006151 A | * | 1/1984 | | 293/102 |
| JP | 62279125 A | * | 12/1987 | | 293/109 |
| JP | 02068245 A | * | 3/1990 | | 293/102 |
| JP | 1178732 | | 3/1999 | | |

* cited by examiner

Primary Examiner—Joseph D. Pape
Assistant Examiner—Lori L Coletta
(74) Attorney, Agent, or Firm—Martin A. Farber

(57) ABSTRACT

An automobile bumper covered with a bumper face comprises an upper bumper including an upper bumper beam and an upper energy absorbing member interposed between the bumper face and the upper bumper beam, and a lower bumper provided below the upper bumper and including a lower bumper beam and a lower energy absorbing member interposed between the bumper face and the lower bumper beam. The lower energy absorbing member is established to have a larger longitudinal strength than the lower energy absorbing member. As a result, when the bumper contacts a leg of a pedestrian, the upper bumper has a larger deformation than the lower bumper and a bending angle of a knee can be reduced, thereby the damage to a knee can be alleviated.

5 Claims, 6 Drawing Sheets

BUMPER STRUCTURE FOR AUTOMOBILE

BACKGROUND OF THE INVENTION

1. Field of the invention

The present invention relates to a bumper structure for a vehicle and more particularly to a bumper structure capable of securing safety of a pedestrian when the vehicle traveling at low speeds contacts the pedestrian.

2. Description of the Related Art

In recent years, automobile bumpers capable of minimizing the damage to a pedestrian when a vehicle traveling at low speeds contacts the pedestrian, have been proposed.

An example of such bumpers is disclosed in Japanese Patent Application Laid-open No. Toku-Kai-Hei 11-78732. FIG. 7 is an exploded perspective view of the example of the a bumper 101. The bumper includes an upper bumper beam 102 and a lower bumper beam 103 extending in a widthwise direction of a vehicle and covered at the front surface thereof with a soft-plastic-made bumper face. The upper bumper beam 102 and the lower bumper beam 103 are supported through an upper bumper stay 104 and a lower bumper stay 105 by a radiator panel 106, respectively.

The upper bumper stay 104 comprises a long outer stay 107 and a short inner stay 108 fitted to the 107. The outer stay 107 is connected at the front end thereof with the upper bumper beam 102 and is connected at the rear end thereof with the radiator panel 106. On the other hand, the inner stay 108 is connected at the rear end thereof only with the radiator panel 106. The outer stay 107 is constituted by a front stay 107a broadening toward the front end and having a relatively high strength and a rear stay 107b having a relatively low strength.

Further, the lower bumper stay 105 is connected at the front end thereof with the lower bumper beam 103 and is connected at the rear end thereof with the radiator panel 106 through a bracket (not shown). The longitudinal strength of the upper bumper stay 104 is established to be smaller than that of the lower bumper stay 105.

According to the bumper structure described above, as shown in FIGS. 8 and 9, when a vehicle traveling at low speeds contacts a pedestrian M, the upper bumper beam 102 contacts a leg R in the vicinity of a knee H of the pedestrian M and the lower bumper beam 103 contacts a lower portion of the leg R.

Then, the upper bumper stay 104 supporting the upper bumper beam 102 collapses at the rear stay 107b and the lower bumper stay 105 collapses itself. Since the strength of the upper bumper stay 104 is smaller than that of the lower bumper stay 105, the amount of deformation of the upper bumper stay 104 is larger than that of the lower bumper stay 105. As a result, as shown in FIG. 9, a force rotating the leg R in the direction A that is, a force scooping the leg R upward is applied to the leg R. This force exerted on the leg R acts as reducing a bending angle θ generating in the knee H. Thus, the damage causing to the knee H can be alleviated by properly controlling the behavior of the leg R at collisions.

When a large impact is applied, both of the front stay 107b having a larger strength and the inner stay 108 collapse.

The bumper structure according to Toku-Kai-Hei 11-78732, when vehicles running at low speeds contact pedestrians, provides the protection of their legs, particularly knees easily being subjected to damages.

However, in this bumper structure, depending on where a pedestrian contacts the automobile bumper, the behavior of the leg R sometimes can not be controlled properly. That is, since the upper bumper stay 104 and the lower bumper stay 105 are disposed on the left and right sides of the vehicle, respectively, for example, when the pedestrian contacts the bumper beams 102 and 103 in the vicinity of the upper bumper stay 104 and the lower bumper stay 105, the rear stay 107b and the lower bumper stay 105 collapse as expected. However, in case where the pedestrian M collides with the middle portion of the upper bumper beam 102 and the lower bumper beam 103, an impact load is dispersed into the left and right bumper stays 104, 105 and as a result, the rear stay 107b and the lower bumper stay 105 provide small collapses and inadequate deformations.

Further, there is fear that the reduction of strength of the upper bumper stay 104 weakens a holding rigidity of the upper bumper beam 102 and as a result, when a large impact load is applied, such bumper structure presents a poor performance as an automobile bumper.

SUMMARY OF THE INVENTION

It is an object of the present invention to provide a bumper structure having an adequate performance as an automobile bumper and at the same time capable of reducing damages to knees of pedestrians.

To achieve the object, a bumper structure for a vehicle covered with a bumper face on the front side thereof and extending in a widthwise direction of the vehicle, comprises an upper bumper beam extending in a widthwise direction of the vehicle, an upper energy absorbing member provided between the bumper face and the upper bumper beam, a lower bumper beam provided below the upper bumper beam and extending in a widthwise direction of the vehicle and a lower energy absorbing member provided between the bumper face and the lower bumper beam and having a larger strength resisting an impact load in a longitudinal direction of the vehicle than the upper energy absorbing member.

BRIEF DESCRIPTION OF THE DRAWINGS

The present invention will be more clearly understood from the description as set forth below with reference to the accompanying drawings, in which.

DETAILED DESCRIPTION OF THE PREFERRED EMBODIMENTS

Figure 1:
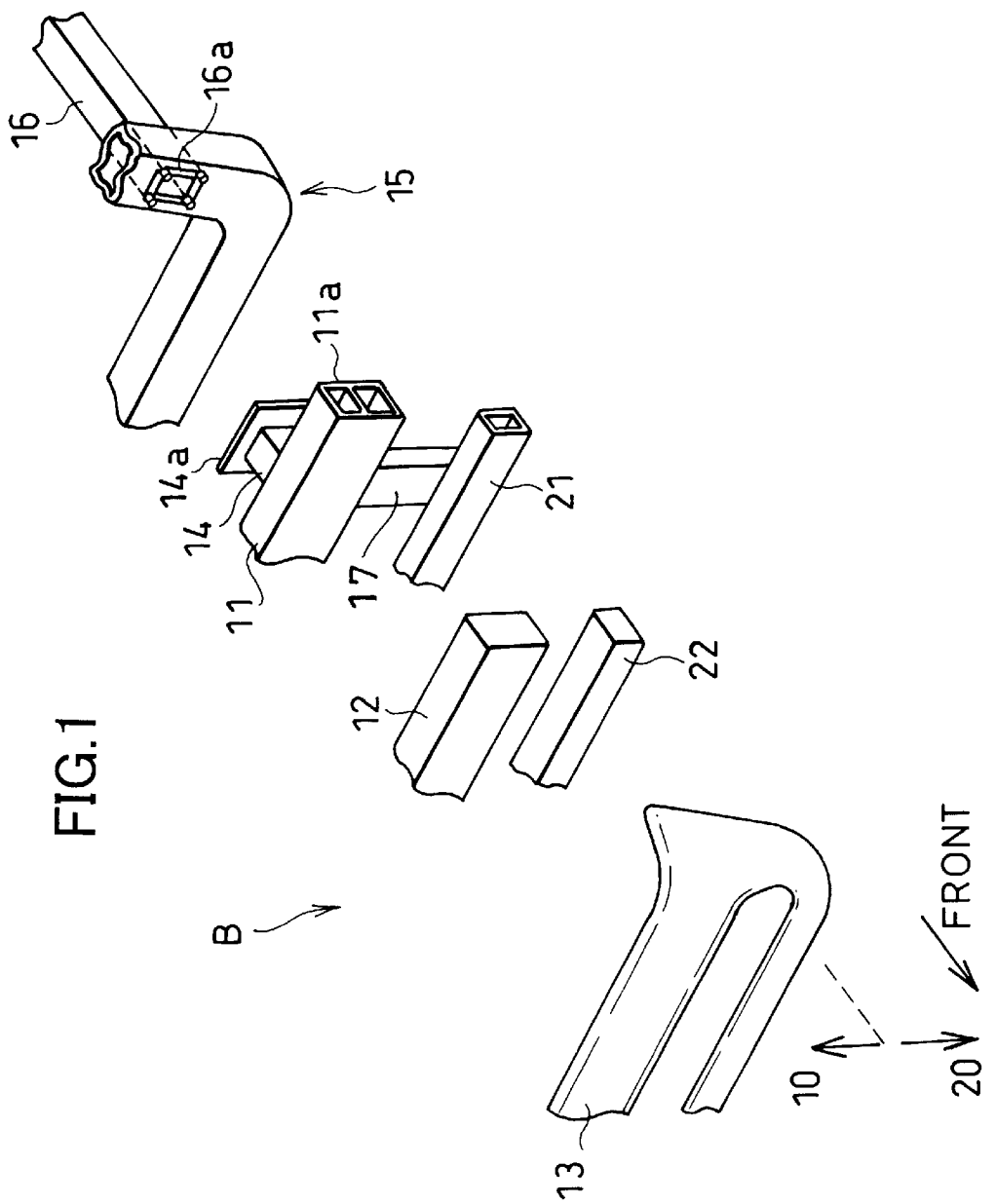
FIG. 1 is an exploded perspective view showing an automobile bumper structure according to a first embodiment of the present invention.

FIG. 1 is an exploded perspective view showing a left side of a bumper B according to a first embodiment. The bumper B is constituted by an upper bumper 10 and a lower bumper 20. Further, the upper bumper 10 includes an upper bumper beam 11 and an upper energy absorbing member 12. Further, the lower bumper 20 includes a lower bumper beam 21 and a lower energy absorbing member 22. Further, the upper energy absorbing member 12 and the lower energy absorbing member 22 are covered with an flexible bumper face 13 formed by a soft plastic.

The upper bumper beam 11 has a rectangular hollow cross section and extends in a transverse direction, substantially to the full width of the vehicle. A bumper beam stay 14 projects rearwards from a rear surface 11a of the upper bumper beam 11 in the vicinity of the side end thereof. A rear end 14a of the bumper beam stay 14 is secured to a front end 16a of a side beam 16 through a radiator panel 15.

The upper energy absorbing member 12 which is formed by an elastic material such as foamed resin, rubber and the like, is interposed between the bumper face 13 and the upper bumper beam 11 over the full length of the upper bumper beam 11.

The lower bumper beam 21 has a rectangular hollow cross section whose area is smaller than that of the upper bumper beam 11 and has the same structure as the upper bumper beam 11. The lower bumper beam 21 is disposed below and in parallel with the upper bumper beam 11 at an appropriate space and extends to the substantially full width of the vehicle. Further, the lower bumper beam 21 is connected with the bumper beam stay 14 or the upper bumper beam 11 through a stay 17.

The lower energy absorbing member 22 formed by an elastic material such as foamed resin, rubber and the like, as in the same manner as the upper energy absorbing member 12, is interposed between the bumper face 13 and the lower bumper beam 21 over the substantially full length of the lower bumper beam 21. Further, the lower energy absorbing member 22 is designed so as to have a smaller vertical thickness than the upper energy absorbing member 12.

In this embodiment, when the same load is applied to the upper bumper 10 and the lower bumper 20, respectively, the lower bumper 20 is constituted so as to have a smaller amount of the deformation in a longitudinal direction of the vehicle than the upper bumper 10. Specifically, the lower energy absorbing member 22 is established to have a longitudinal strength larger than that of the upper energy absorbing member 12. For example, in case where the upper and lower energy absorbing members 12, 22 are formed by foamed resin, the diameter of foams of the upper energy absorbing member 12 is established to be larger than that of the lower energy absorbing member 22 or the number of foams of the upper energy absorbing member 12 is established to larger than that of the lower energy absorbing member 22. Further, in case where the upper and lower energy absorbing members 12, 22 are formed by rubber, the hardness of rubber in the lower energy absorbing member 22 is established to be higher than that in the upper energy absorbing member 12.

Since the upper and lower energy absorbing members 12, 22 are thus constituted, when the same impact load is applied concurrently to both the upper and lower bumpers 10, 20, the upper bumper 10 is relatively deformable and the lower bumper 20 is relatively less deformable.

Figure 2:
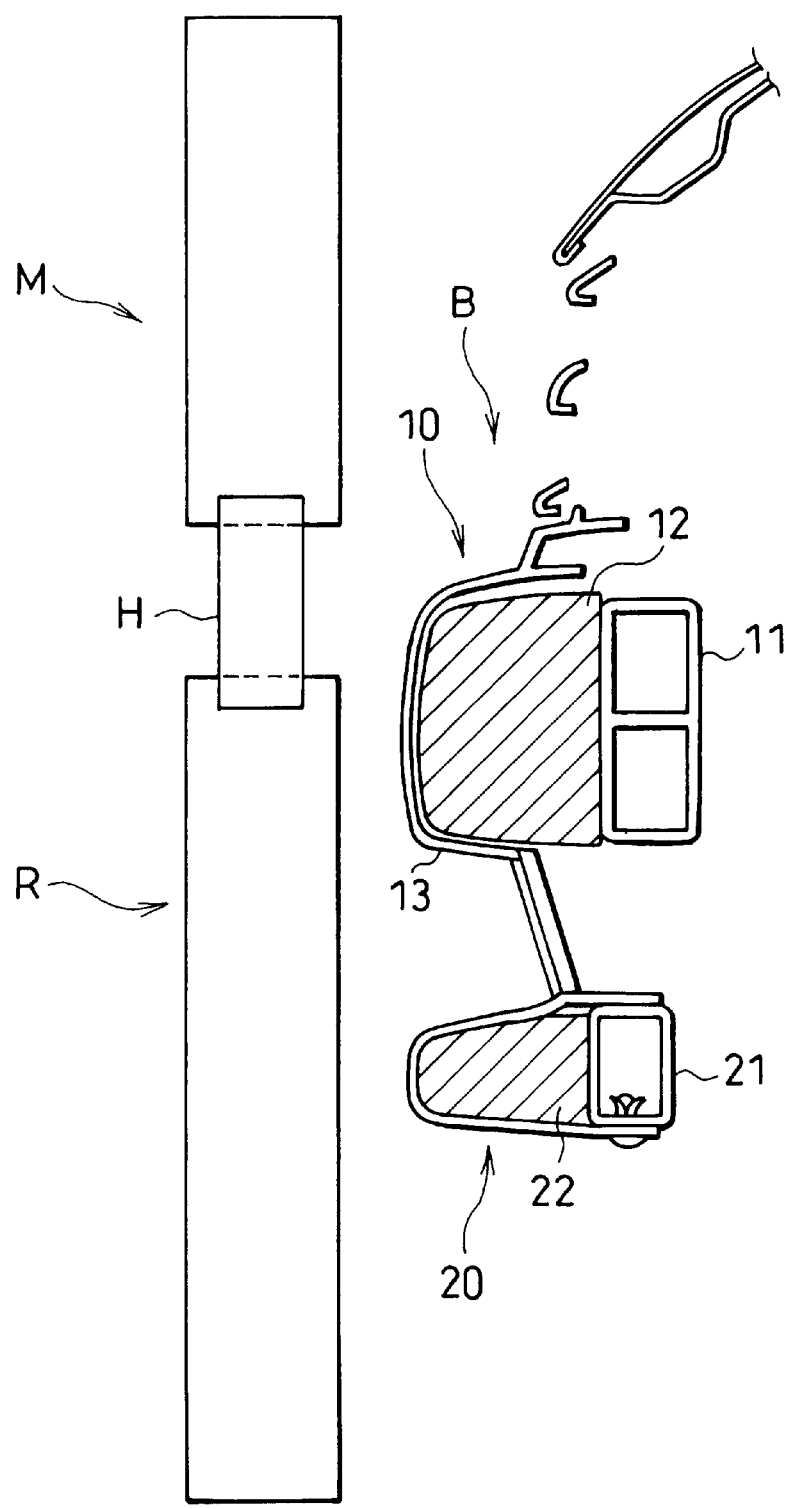
FIG. 2 is a schematic view showing a positional relationship between an automobile bumper according to a first embodiment and a human leg.
Figure 3:
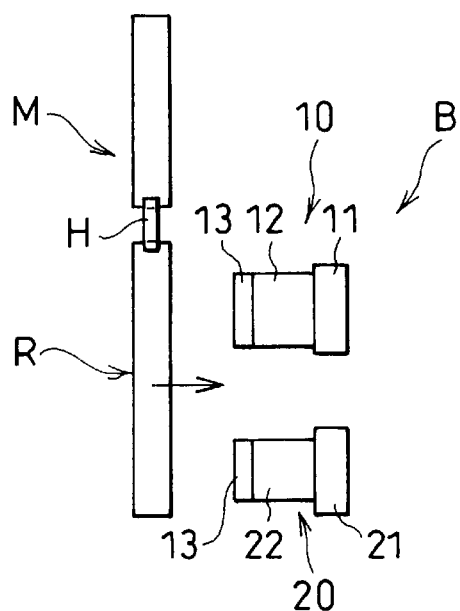
FIGS. 3 and 4 are schematic views for explaining an operation of an automobile bumper according to a first embodiment, respectively.

As shown in FIG. 2, in case where a vehicle traveling at low speeds contacts a pedestrian M, the upper bumper 10 contacts a leg R in the vicinity of a knee H and almost simultaneously, the lower bumper 20 contacts the lower part of the leg R. At this moment, the amount of collapsing deformation of the lower energy absorbing member 22 is smaller than that of the upper energy absorbing member 12, because the lower energy absorbing member 22 has a larger longitudinal strength than the upper energy absorbing member 12.

Figure 4:
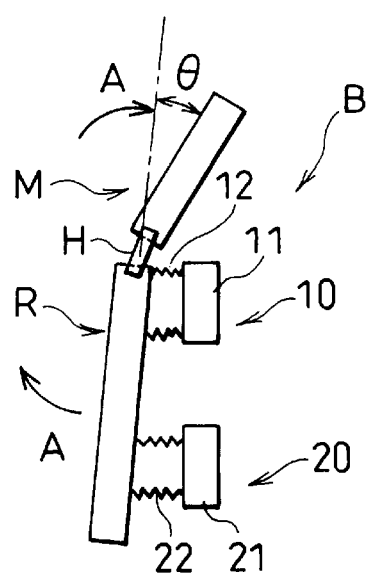

Accordingly, as shown in FIG. 4, the lower bumper 20 pushes the lower part of the leg R forward and, on the other hand, the upper bumper 10 moves the neighborhood of the knee H relatively backward. As a result, a rotating force is generated in the leg R in an arrow direction A. Hence, the impact load applied to the knee H can be alleviated and at the same time the bending angle θ generating in the knee H can be reduced.

Thus, since the behavior of the leg R on impact is appropriately controlled, the damage to the leg R, particularly the damage to the knee H can be reduced.

Further, the components constituting the upper bumper 10, that is, the bumper face 13, the upper energy absorbing member 12 and the upper bumper beam 11 extend in the widthwise direction of the vehicle and have an identical cross section in any position. Further, the lower bumper 20 has an identical sectional structure in any position. Accordingly, the effect of reducing damages to the knee H is the same irrespective of the position of the bumper B where the pedestrian M contacts.

Further, the rigidity and strength of the bumper beam stay 14 for supporting the upper bumper beam 11 and the lower bumper beam 21 can be adequately increased, therefore, when a large impact load is applied to the bumper beam B, the bumper beam B can alleviate the impact in a secured manner.

Figure 5:
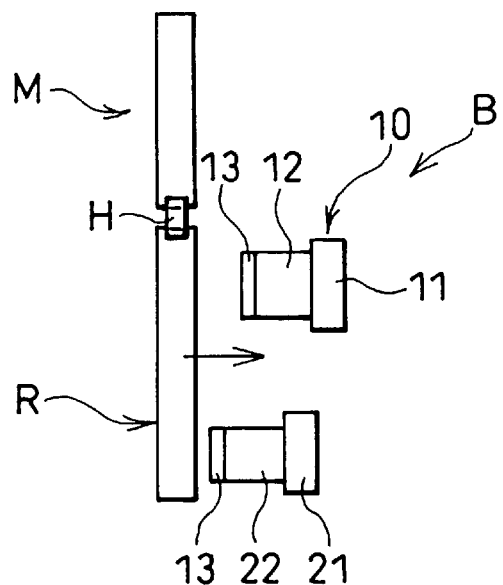
FIGS. 5 and 6 are schematic views for explaining an operation of an automobile bumper according to a second embodiment, respectively.
Figure 6:
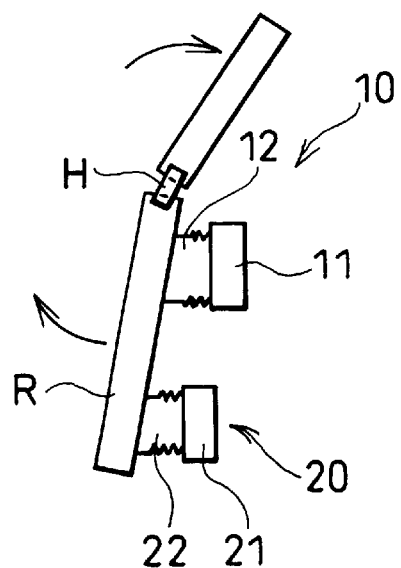
Figure 7:
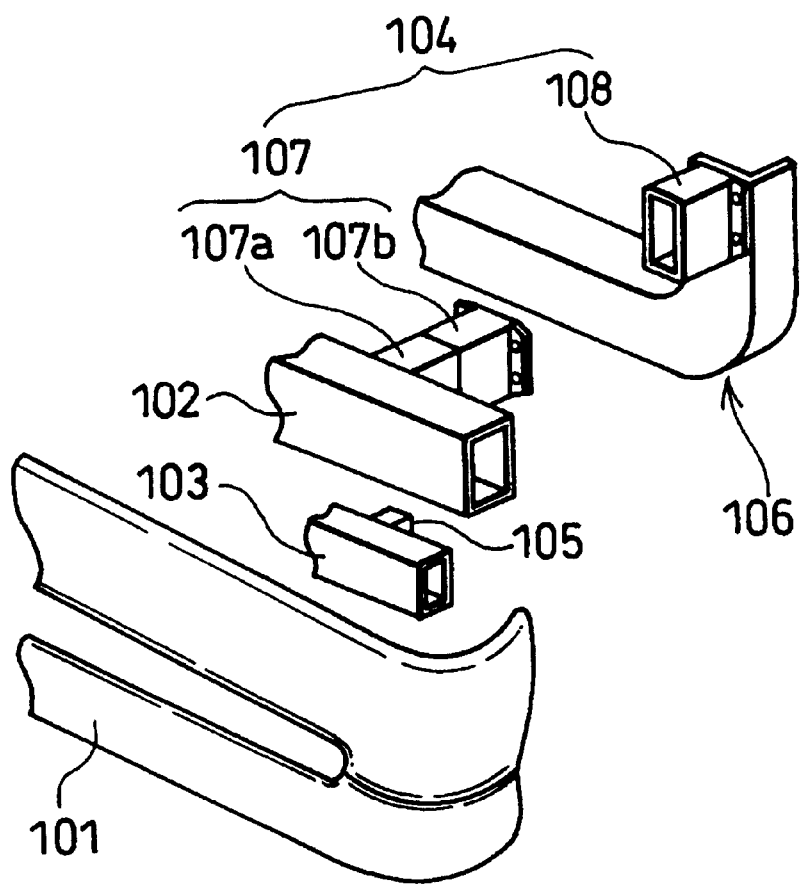
FIG. 7 is an exploded perspective view of an automobile bumper according to prior art.
Figure 8:
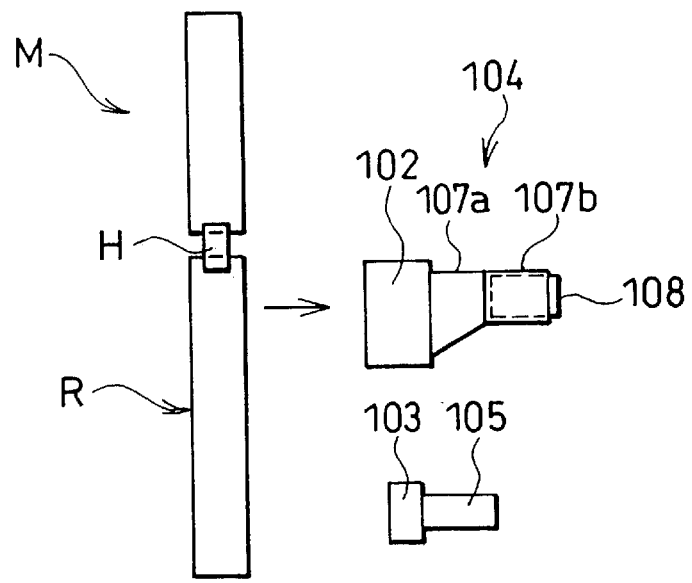
FIGS. 8 and 9 are schematic views for explaining an operation of an automobile bumper according to prior art, respectively.
Figure 9:
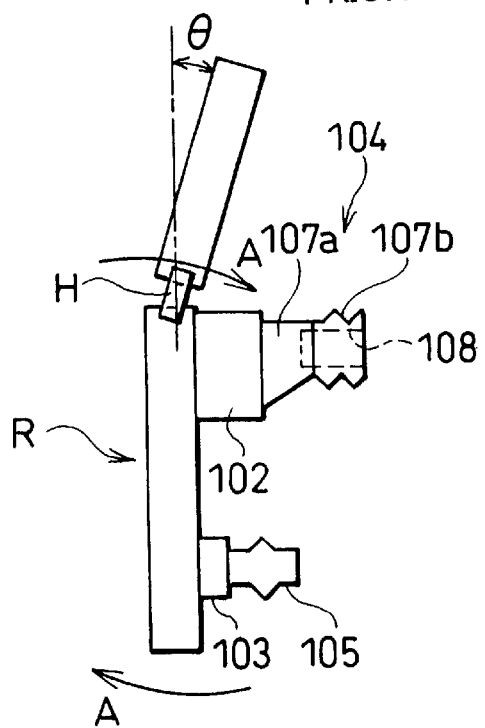

Next, a second embodiment will be described by reference to FIGS. 5 and 6.

In this embodiment, what is different from the first embodiment is that the longitudinal strength, that is the strength resisting an impact load applied in a longitudinal direction of the vehicle, of the upper and lower energy absorbing members 12, 22 is established to be identical to each other and the lower bumper 20 including the lower bumper beam 21 and the lower energy absorbing member 22 is established so as to come in front of the upper bumper 10 including the upper bumper beam 11 and the upper energy absorbing member 12.

According to the second embodiment, a rotating force can be given to the leg R in an arrow direction A. That is, when the pedestrian M collides with the automobile bumper B. first the lower bumper 20 contacts the leg R and after that the upper bumper 10 contacts the neighborhood of the knee H. As a result, a rotating force in an arrow direction A is applied to the leg R, as in the same manner as the first embodiment.

According to the second embodiment, similarly to the first embodiment, the behavior of the leg R on impacts can be appropriately controlled and as a result the impact load applied to the knee H can be reduced, thereby the damage to the knee H can be alleviated.

In this embodiment, the longitudinal strength of the upper and lower energy absorbing members 12, 22 are established to be identical to each other, however, from the object of the present invention, the strength of the lower energy absorbing member 22 may be larger than that of the upper energy absorbing member 12.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A bumper structure for a vehicle provided in a front portion of said vehicle and covered with a bumper face on the front side thereof and extending in a widthwise direction of said vehicle, comprising:

an upper bumper beam extending in a widthwise direction of said vehicle;

an upper energy absorbing member provided between said bumper face and said upper bumper beam;

a lower bumper beam provided below said upper bumper beam and extending in a widthwise direction of said vehicle; and a lower energy absorbing member provided between said bumper face and said lower bumper beam and having a larger strength resisting an impact load in a longitudinal direction of said vehicle than said upper energy absorbing member.

2. A bumper structure for a vehicle provided in a front portion of said vehicle and covered with a bumper face on the front side thereof and extending in a widthwise direction of said vehicle, comprising:

an upper bumper covered with said bumper face and including an upper bumper beam and an upper energy absorbing member between said bumper face and said upper bumper beam; and a lower bumper covered with said bumper face and protruded ahead of said upper bumper and including a lower bumper beam and a lower energy absorbing member between said bumper face and said lower bumper beam.

3. The bumper structure according to claim 2, wherein said lower energy absorbing member has a larger strength resisting an impact load in a longitudinal direction of said vehicle than said upper energy absorbing member.

4. The bumper structure according to claim 1, wherein said lower bumper beam is approximately in parallel with said upper bumper beam with a space between said upper and lower bumper beams.

5. The bumper structure according to claim 2, wherein said lower bumper beam is disposed below and approximately in parallel with said upper bumper beam with a space between said upper and lower bumper beams.

* * * * *